(12) United States Patent
Chung

(10) Patent No.: US 8,591,784 B1
(45) Date of Patent: Nov. 26, 2013

(54) MOLDED SHOE RANDS

(75) Inventor: Brian Chung, Newport Beach, CA (US)

(73) Assignee: Evolve Sports & Designs, Buena Park, CA (US)

( * ) Notice: Subject to any disclaimer, the term of this patent is extended or adjusted under 35 U.S.C. 154(b) by 483 days.

(21) Appl. No.: 12/859,087

(22) Filed: Aug. 18, 2010

Related U.S. Application Data

(60) Provisional application No. 61/234,929, filed on Aug. 18, 2009.

(51) Int. Cl.
*B22D 25/00* (2006.01)

(52) U.S. Cl.
USPC ...................................... 264/219; 264/331.13

(58) Field of Classification Search
USPC .................................................. 264/219, 220
See application file for complete search history.

(56) References Cited

U.S. PATENT DOCUMENTS

| | | | | |
|---|---|---|---|---|
| 2,379,366 A | * | 6/1945 | Lumbard | 36/37 |
| 5,552,992 A | * | 9/1996 | Hunter | 700/118 |
| 6,299,962 B1 | * | 10/2001 | Davis et al. | 428/98 |
| 2005/0188562 A1 | * | 9/2005 | Clarke et al. | 36/15 |

* cited by examiner

*Primary Examiner* — Galen Hauth
(74) *Attorney, Agent, or Firm* — Bruce E. Weir

(57) ABSTRACT

A variable-thickness climbing shoe rand may be fabricated by digitally scanning a variable-thickness rand prototype, transmitting scan data to a computer numerically controlled mold fabrication device, creating a rand mold with the mold fabrication device, cutting a slab of uncured high-friction rubber to fit within the mold, and curing the slab within the mold to create a variable-thickness climbing shoe rand, which may then be bonded to a climbing shoe upper and finished with little or no grinding.

2 Claims, 5 Drawing Sheets

MOLDED SHOE RANDS

CROSS-REFERENCE TO RELATED APPLICATION

This application claims the benefit of U.S. provisional patent application Ser. No. 61/234,929, filed by the same inventor on Aug. 18, 2009.

BACKGROUND

Rock climbing footwear is specifically constructed for rock climbing in outdoor environments and indoor climbing facilities. Rock climbing footwear is typically composed of three basic components: an upper, an outsole and a mid-sole. By design, all three of these components give rock climbing shoes their distinctive performance characteristics.

The upper of a rock climbing shoe is typically composed of leather, a synthetic material, or a combination of both. The upper provides an abrasion-resistant protective covering for the dorsal surface of the foot. The upper of the shoe has either elastic stretch panels or a lacing system to secure the footwear on the foot. In the heel area, pull tabs are often added to the upper to help pull the shoe onto the foot.

Rock climbing footwear typically has low interior volume and therefore a foot-conforming or snug fit. To provide dimensional stability to the upper, a lining material is often laminated to the upper. The lining can increase user comfort by limiting stretch of the upper, managing foot perspiration during periods of activity, and offering a degree of insulation.

The outsole of the rock climbing shoe is the plantar section of the shoe which contacts the ground when the climber walks. It is typically, but not always, devoid of tread patterns. Outsoles are made with special rubber compounds with high friction properties that enable the climber to adhere to climbing surfaces.

The midsole of a rock climbing shoe is laminated between the upper and outsole. The physical properties of a midsole affect the performance of a shoe. The thinner and more flexible the midsole, the greater the proprioception between the climber and the climbing surface. Additionally, a thin, flexible midsole increases the contact surface between the outsole and the climbing surface, maximizing the shoe's adhesion to the climbing surface.

A thin outsole compliments a thin midsole for climbing on small surface features. Soft and flexible synergistic upper, midsole and outsole designs allow a shoe's rubber outsole better conformation to the climbing surface.

In other climbing situations, a thicker, longer and less flexible midsole is desirable. In such cases, more of the climber's weight is transferred to the lateral and medial edges of the shoe, thereby decreasing his or her fatigue by shifting the work to the larger musculoskeletal groups of the legs. This increases efficiency when forefoot edge contact or edging is utilized, advantageous when climbing cracks or minute ledges. Firmer, less flexible overall designs are generally better for all-day climbing, walking comfort and crack climbing environments.

To provide additional climbing performance, rubber overlays or rands are applied over and around the forefoot and rearfoot areas of the shoe. The rand is made from a high-friction rubber, similar to the outsole material, providing greater adhesion to a variety of climbing surfaces. The rand provides additional structural support to the upper, a more secure fit and abrasion resistance.

A forefoot rand gives the climber additional purchase when using the upper's sides or dorsal area for climbing features such as cracks, in which the outsole of the shoe has little contact with the climbing surface. A rearfoot rand has an additional performance function in applying tension to the Achilles' tendon and arch area of the foot, further securing the shoe to the foot. Putting tension on the Achilles' tendon allows the climber to use techniques such as the heel hook, a means of pulling with the posterior portion of the climber's heel. A rearfoot rand can also tension the foot within the forefoot of the shoe, thereby concentrating more force on the great toes.

Currently, sheet or roll stock of high friction rubber of uniform thickness is used to produce rands for the climbing shoe manufacturing process. This high friction rubber is laid out on a cutting table or on a heavy die cutting mechanical press table and cut manually or mechanically with metal dies designed for the style and function of the shoe being produced. This step is labor intensive as the worker has to align the cutting die on the rubber to maximize rubber cutting yield yet avoid flaws that occasionally appear in the stock rubber.

Typically, the employee that performs this work is one of the highest paid workers on the assembly line because of the efficiency required and personal safety risk involved in the cutting process. Even though modern mechanical die cutting presses or clicker presses have incorporated safety systems, operators have accidentally lost parts of their hands while using clicker presses. Die cutting methods pose a constant safety risk regardless of the skill or attention of the worker.

Additional design or functional elements not already incorporated into the die can be added to the rand after the rand is die cut. Design or functional elements range from simple holes or ovals manually punched through the rand to more elaborate punches such as logographic marks or flex reliefs. Like the die cutting process, there is non-recyclable waste produced as well as additional labor required to complete this step.

After the climbing shoe upper is assembled and the last (the company's proprietary form in the anatomical shape and volume of a human foot taken transaxially and distally from the lateral malleolus) is inserted, the rand is ready to be bonded to the upper assembly. A heat-activated proprietary adhesive is applied to the upper and rand components. The upper and rand components are then pressed together for a specific time at a particular temperature. The remaining shoe construction steps, well known by those in the industry, are taken to complete the shoe assembly.

The assembled shoe is ready for finishing steps, one of which is grinding the rand and the outsole to match a given design and functional profile. Since the rand is cut from stock of uniform thickness, areas were the rand needs to be thinner are removed with an industrial grinding wheel. This process poses a number of hazards to the worker, such as accidental contact with the grinding wheel, inhalation of particulate and rubber dust, getting particulate rubber into the eyes, hearing loss due to elevated noise levels created by the grinder and, under certain environmental conditions, the possibility of explosion and fire caused by rubber dust suspended in the air.

To mitigate some of the worker safety issues, protective eyewear, personal noise reduction devices, respirators and protective clothing are available to or provided by the factory. To reduce the chance of explosion, vacuum dust recovery systems must be installed, serviced regularly and emptied as they fill with rubber compounds. All these steps require additional labor, expense and the willingness of both management and employees to adopt these measures.

The die cutting and grinding process also creates environmental problems. One by-product generated by this process is a waste stream of rubber that has no recyclable content, although it can be used as filler material in certain applications. However, the majority of waste rubber compound is disposed of in landfills.

Die cutting and grinding methods also consume considerable raw material and energy. Utilization of inefficient die cutting and grinding methods wastes a significant amount of high friction rubber, the most expensive component of the climbing shoe. High friction rubber is made from non-renewable, petrochemical-based components, the prices of which continue to increase.

Clearly there is a need in the industry to reduce exposure to workplace hazards, wasted productivity and greater high friction rubber yield in the production of climbing shoes, particularly in the production of the forefoot rand.

SUMMARY

Embodiments of the invention remedy the defects of die-cutting methods by allowing fabrication of a climbing shoe with a variable-thickness rand without rand grinding. A variable-thickness rand prototype is created and scanned with a digital scanner. Scan data is transmitted to a computer numerically controlled mold fabrication device. A rand mold is created by the mold fabrication device and a slab of uncured high-friction rubber is placed within the rand mold and cured to create a variable-thickness climbing shoe rand. The rand is then bonded to a climbing shoe upper.

DETAILED DESCRIPTION

A preferred embodiment of the invention uses molds to precisely shape the profiles of rands. This approach eliminates the die cutting process, most of its associated waste, and many workplace hazards, reduces labor costs and avoids the inherent limitations of sheet rubber. In addition, ornamental and functional elements that are cost-prohibitive or impossible to produce with cutting dies can be incorporated into a mold design.

Molds can be created from electronic data files and produced by CNC machinery in methods known in the industry. In contrast, die designs are sent to a die maker who manually bends the knives to make the die. The rand unit yield per mold is consistent for the lifespan of the tool. A die, however, must be re-sharpened or repaired if its lifespan is shorter than the production run for the product components cut. Since molded rand component profiles are designed to fit without grinding or die cutting, fewer non-renewable resources are used and energy use is directed into mold making and the rubber molding process.

Performance of a shoe may be enhanced by adding precisely-calibrated amounts of rubber to the areas where it is most needed. For example, the great toes area of the shoe's upper are subject to the most abrasion exposure in normal climbing. By carefully designing the mold to include additional thickness in that area, the longevity of the footwear is increased. Another advantage to this invention is the inclusion of strategically-molded rand reinforcements designed to mitigate lateral and medial forefoot rand deformation and provide flex relief above flexed joints while the toes undergo dorsiflexion.

Die cut rands have been unable to provide adequate dimensional stability in uppers, resulting in a loss of precision as toes push out or bulge the forefoot rand. A molded rand can provide an exact combination of flex reliefs, variable rand thickness and compound anatomical shapes that may not be economically or technically feasible with die cutting methods. Thus the climber realizes a higher degree of precision, comfort and stability.

Figure 1A:
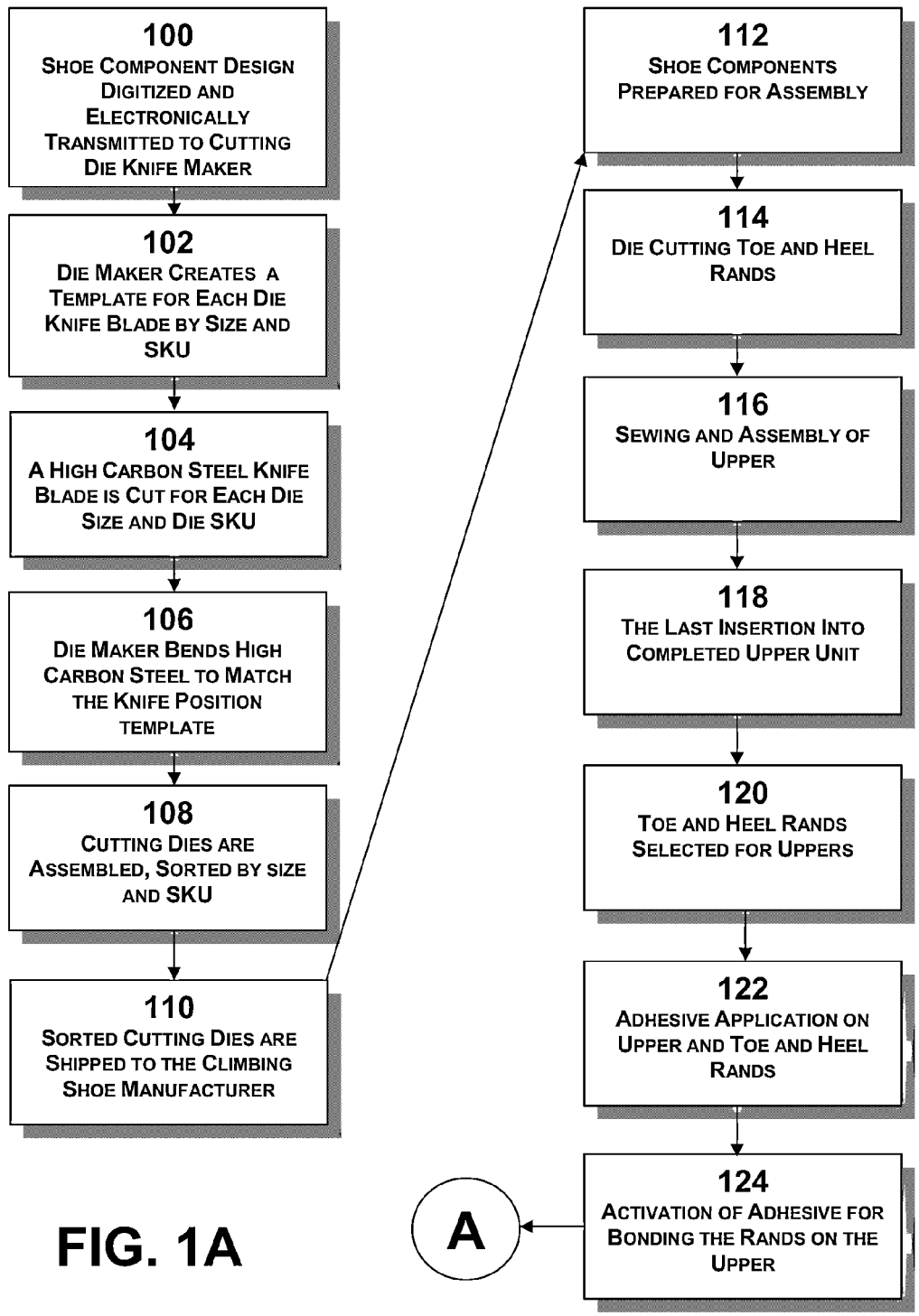
FIGS. 1A and 1B show a flow diagram for die-cutting shoe assembly.
Figure 1B:
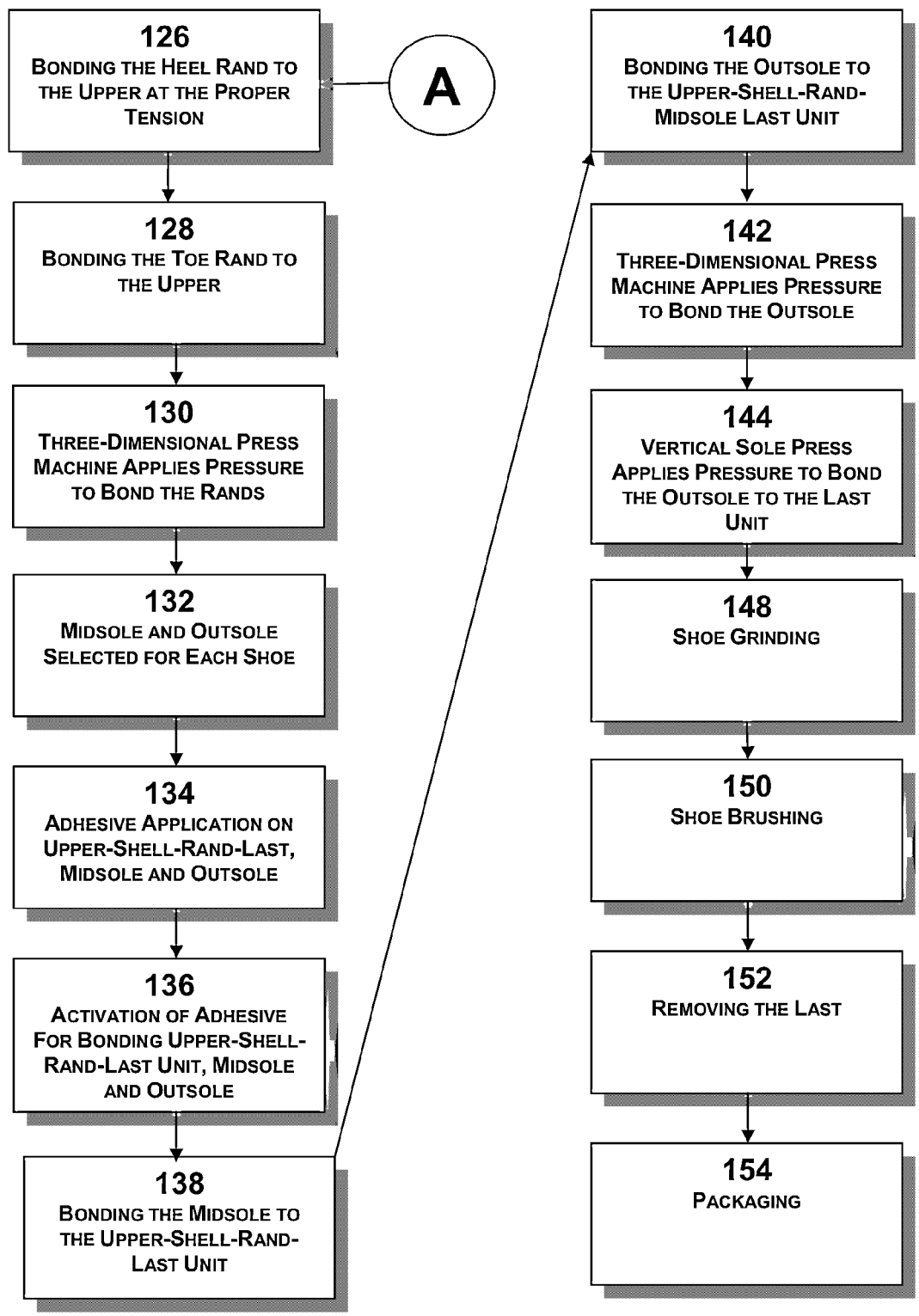
Figure 2A:
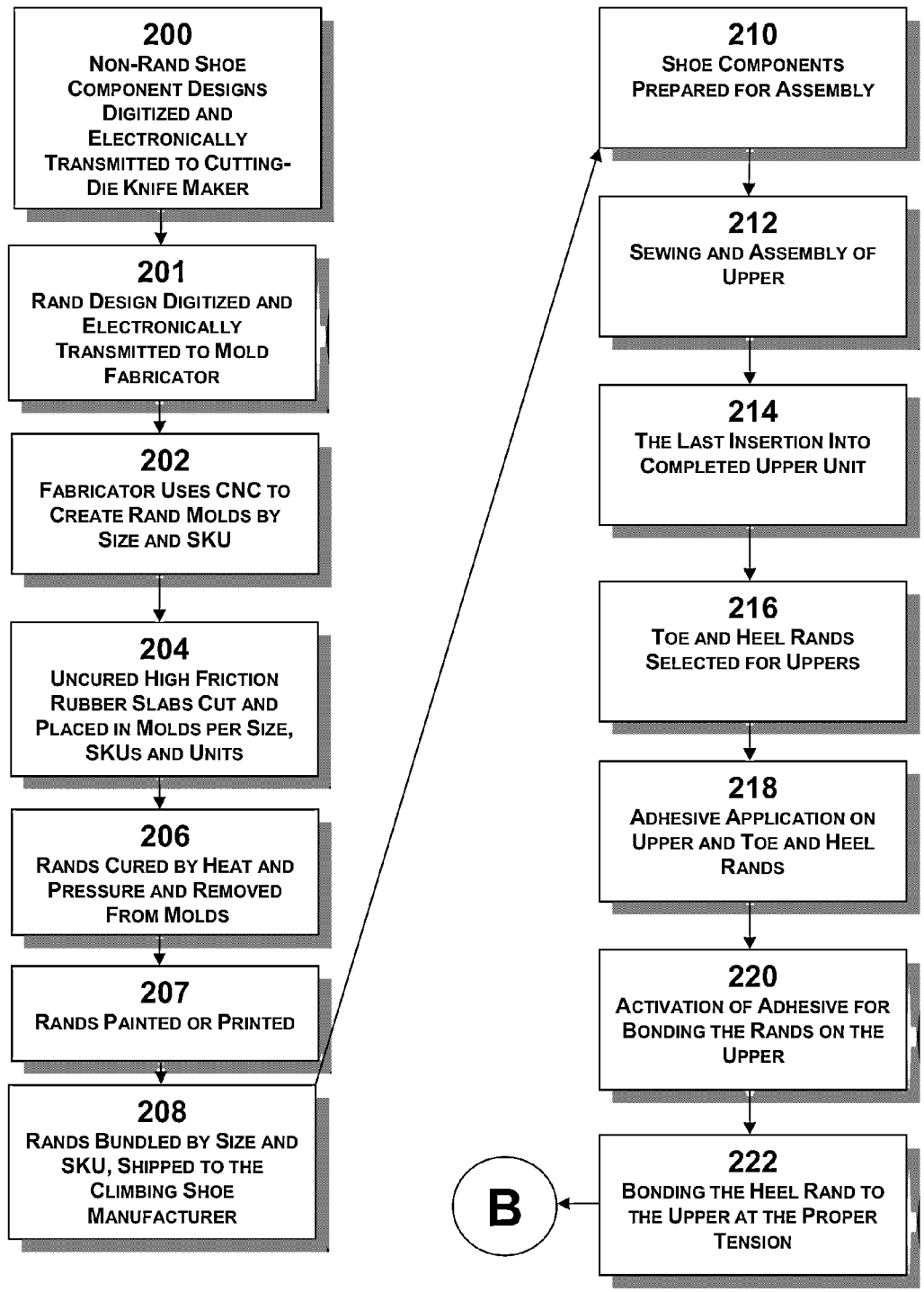
FIGS. 2A and 2B show a flow diagram for shoe assembly with molded rands.
Figure 2B:
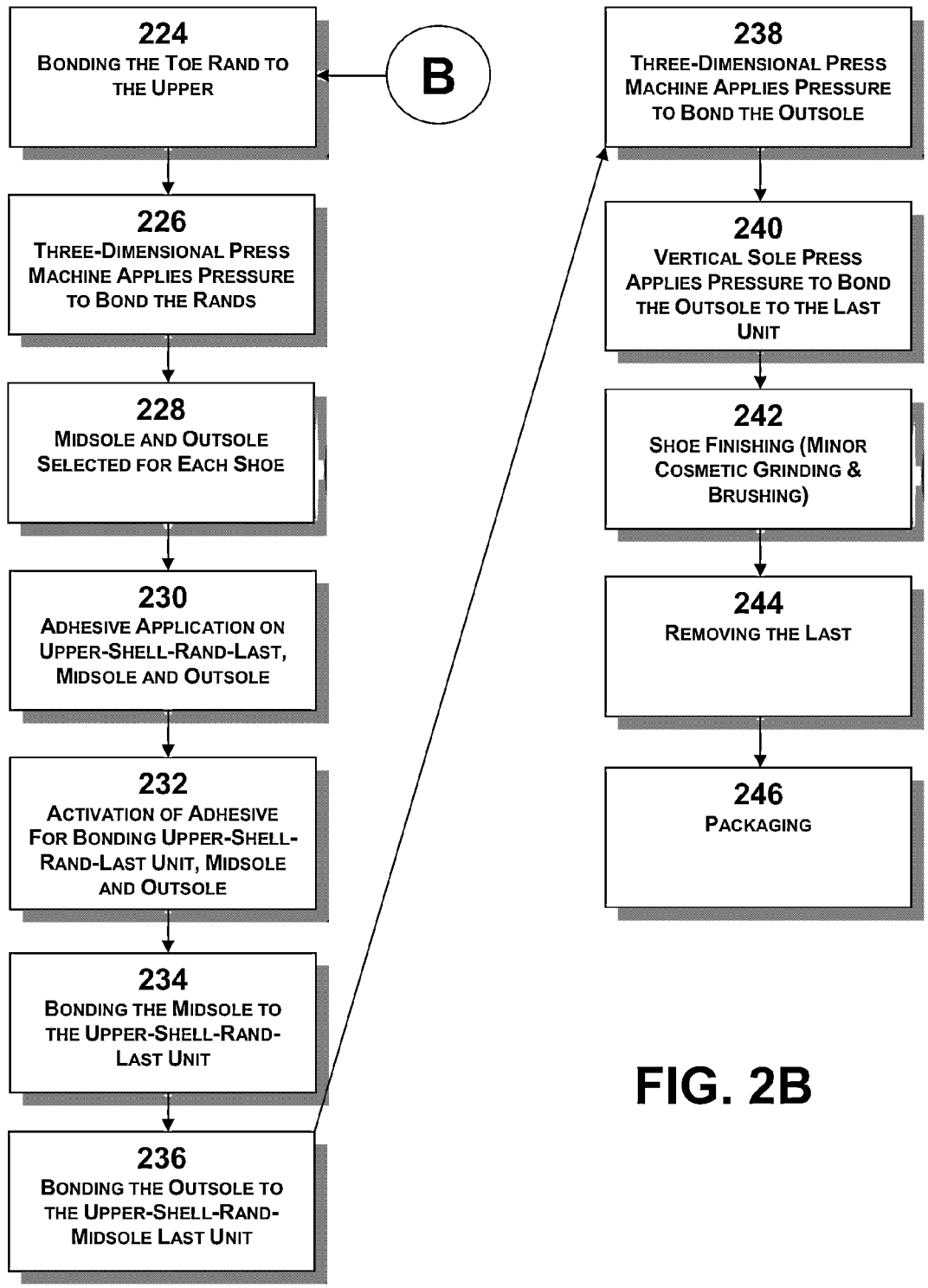

FIGS. 1A, 1B, 2A and 2B provide a comparison between climbing shoe assembly methods utilizing die-cutting and molding. FIGS. 1A and 1B show a flow diagram for die-cutting shoe assembly. FIGS. 2A and 2B show a flow diagram for shoe assembly with molded rands.

FIG. 1A shows steps performed in a typical die-cutting shoe assembly process. Shoe component designs for die-cut components are digitized and electronically transmitted 100 to a cutting-die manufacturer. The die manufacturer creates a template 102 for each die knife blade according to the sizes and model stock-keeping-unit (SKU) numbers of the desired end products. A die knife blade is cut 104 from high-carbon steel for each shoe size and SKU, then bent 106 to match the corresponding template. The dies are assembled and sorted 108 by size and SKU and shipped 110 to the show manufacturer.

The manufacturer uses known methods to prepare shoe components 112 for assembly, including die cutting of toe and heel rands 114. Each upper is sewn 116 and fitted onto a last 118. Appropriately-sized toe and heel rands are selected 120 for each upper. An adhesive is applied 122 to portions of each upper where a rand is to be attached and to the inner surfaces of the rands. The adhesive is thermally activated 124. Moving to FIG. 1B, a selected heel rand is positioned, tensioned, and bonded 126 to each upper. A toe rand is similarly positioned and bonded 128 to each upper. A three-dimensional press applies pressure to the rands 130 to produce a secure bond.

With the rands bonded in place, a midsole and outsole is selected 132 for each shoe. Adhesive is applied 134 to the portions of each upper and rand to which a midsole will be bonded, to both surfaces of each midsole, and to the inner surface of each outsole. The adhesive is thermally activated 136. The midsole is bonded 138 to the upper and rands, then the outsole is bonded 140 to the midsole. A three-dimensional press applies pressure 142 to the upper, midsole and outsole to produce a secure bond. A vertical sole press applies pressure 144 to the outsole to ensure attachment.

Each resulting shoe is laboriously ground 148 to smooth rough and uneven edges and to reduce rubber thickness in specific areas. Each shoe is brushed 150 to further smooth surfaces and remove grinding residue. Each shoe is removed from its last 152 and packaged 154.

FIG. 2A shows shoe fabrication steps performed in a preferred embodiment of the inventive method utilizing molded rands. Designs for die-cut components other than rands are digitized and electronically transmitted 200 to a cutting-die manufacturer who produces and ships dies in the manner described above. Designs for rands are digitized and electronically transmitted 201 to a mold fabricator.

The mold fabricator uses a computer numerically controlled (CNC) system to fabricate a rand mold 202 for each size and SKU number of the desired end products. The fabricator cuts a slab of uncured high-friction rubber to a perimeter shaped to fit within each mold and places a cut slab 204 into each mold, cures each slab with heat and pressure, allows each mold to cool adequately, and removes each rand from its mold 206. In an alternative embodiment, uncured rubber may be injected into molds.

This process allows a manufacturer to experiment with and perfect a prototype rand, then scan and digitize the design for transmission to a mold fabricator to quickly produce a size-scaled set of rand molds. Each mold to precisely reproduces the prototype in any desired shoe size. Logos, graphics, and other cosmetic features may be painted or printed on a rand 207. The rands are then bundled according to size and SKU and shipped to a shoe manufacturer 208.

The shoe manufacturer uses known methods to prepare shoe components 210 for assembly. Each upper is sewn 212 and fitted onto a last 214. Appropriately-sized toe and heel rands are selected 216 for each upper. An adhesive is applied 218 to portions of each upper where a rand is to be attached and to the inner surfaces of the rands. The adhesive is thermally activated 220. A selected heel rand is positioned, tensioned, and bonded 222 to each upper.

Moving to FIG. 2B, a toe rand is similarly positioned and bonded 224 to each upper. A three-dimensional press applies pressure to the rands 226 to produce a secure bond. With the rands bonded in place, a midsole and outsole is selected 228 for each shoe. Adhesive is applied 230 to the portions of each upper and rand to which a midsole will be bonded, to both surfaces of each midsole, and to the inner surface of each outsole. The adhesive is thermally activated 232. The midsole is bonded 234 to the upper and rands, then the outsole is bonded 236 to the midsole. A three-dimensional press applies pressure 238 to the upper, midsole and outsole to produce a secure bond. A vertical sole press applies pressure 240 to the outsole to ensure attachment. If necessary, each resulting shoe may be lightly ground and brushed 242, then each shoe is removed from its last 244 and packaged 246.

While the rand molding process disclosed above produces finished rands ready for assembly in a shoe, the die-cutting process requires additional steps that increase labor and waste. In addition to streamlining the shoe production process, rand molding allows a manufacturer to balance conflicting design requirements by making localized adjustments to the fit and stiffness of a rand. For example, a climbing shoe must provide an extremely close fit to a climber's great toe to enable the climber to place and weight the toe on a thin edge or in a narrow crack. The forefoot rand of a climbing shoe surrounds and is pressed against the medial side and end of the great toe and often wraps over the top of the great toe with a feature known as a "toe swirl."

The portion of the forefoot rand surrounding the medial side and end of the great toe must be stiff enough to resist the tendency to bulge outward in response to pressure from the toe. Otherwise, the bulge may impair the climber's ability to place the maximum possible area of the shoe's outsole beneath the toe in contact with a supporting rock feature, thus reducing the climber's ability to support weight on that toe. On the other hand, the toe swirl above the same toe must be flexible enough to comfortably accommodate the flexed joint of the climber's toe.

A die-cut rand is usually cut from a single-thickness sheet of rubber, forcing the shoe designer to choose between excessively thin rand material around the sides and end of the great toe or excessively thick rand material for the toe swirl. Thick material may be ground thin in certain spots but the grinding operation is laborious, wasteful and difficult to perform consistently. Alternatively, additional die cutting may provide flex relief but may also require one or more additional manufacturing steps. Conversely, thin material may be layered to thicken certain spots. However, additional laminations require additional construction steps and increase the likelihood of delamination. Thin forefoot rand material is therefore seldom laminated and, as a result, deforms and wears out easily.

Figure 3:
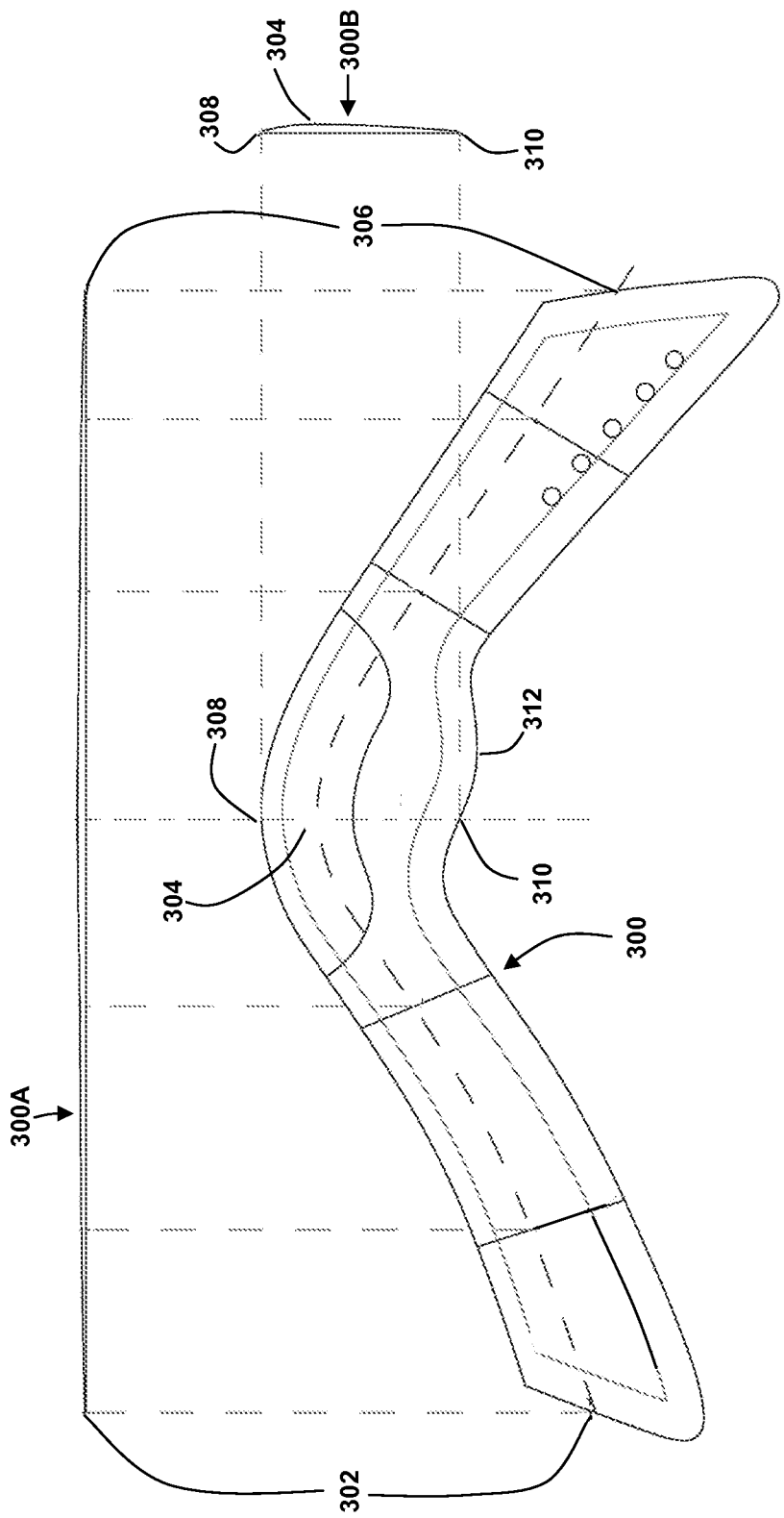
FIG. 3 provides a plan view of an example of a variable-thickness rand produced by the molding process of FIGS. 2A and 2B.

FIG. 3 provides a plan view of an example of a variable-thickness rand produced by the molding process of FIGS. 2A and 2B. A left toe rand 300 is shown in juxtaposition with a lengthwise cross-section 300A, passing from a lateral end 302 through a toe end 304 to a medial end 306, and an orthogonal cross-section 300B, passing from a lower toe edge 308 to an upper toe edge 310. A convexity in the upper toe edge 310 forms a toe swirl 312.

The lengthwise thickness of the rand 300 increases continuously from 0.5 mm near the lateral end 302 to 2.5 mm at the toe end 304, then decreases again to 0.5 mm near the medial end 306. From the lower edge 308 to the toe end 304 the rand thickness increases rapidly from 0.5 mm to 2.5 mm, maintains a thickness in excess of 2.0 mm up to the toe end, then gradually tapers to 0.5 mm at the upper toe edge 310.

This three-dimensional, multi-directional thickness variation concentrates the thickest portion of the toe rand at the end of the toe, where stiffness is needed to resist bulging, and thins smoothly and continuously to the ends 302, 306 and the toe swirl 312 to provide flexibility where needed. No grinding, drilling, or additional laminations are needed. The climber may therefore concentrate weight on the leading edge of the outsole beneath the big toe while enjoying flexibility in the shoe components near the ball of the foot and above the big toe.

The principles, embodiments, and modes of operation of the present invention have been set forth in the foregoing specification. The embodiments disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously contemplated. Numerous variations and changes can be made to the foregoing illustrative embodiments without departing from the scope and spirit of the present invention.

I claim:

1. A method for fabricating a variable-thickness climbing shoe rand, comprising:

creating a variable-thickness forefoot rand prototype that increases in thickness from a lateral end to a toe end, then decreases in thickness from the toe end to a medial end, and increases in thickness from a lower edge to the toe end, then decreases in thickness from the toe end to an upper toe edge;

scanning the variable-thickness rand prototype with a digital scanner, the digital scanner creating data for reproduction of the variable-thickness rand prototype;

transmitting the data to a computer numerically controlled mold fabrication device;

creating a rand mold with the mold fabrication device;

cutting a slab of uncured high-friction rubber to fit within the rand mold;

inserting the slab of uncured high-friction rubber into the rand mold;

forming a variable-thickness climbing shoe rand by curing the slab with heat and pressure within the rand mold; and removing the variable-thickness climbing shoe rand from the mold.

2. A method for fabricating a climbing shoe with a variable-thickness rand, comprising:

creating a variable-thickness forefoot rand prototype that increases in thickness from a lateral end to a toe end, then decreases in thickness from the toe end to a medial end, and increases in thickness from a lower edge to the toe end, then decreases in thickness from the toe end to an upper toe edge;

scanning the variable-thickness rand prototype with a digital scanner, the digital scanner creating data for reproduction of the variable-thickness rand prototype;

transmitting the data to a computer numerically controlled mold fabrication device;

creating a rand mold with the mold fabrication device;

cutting a slab of uncured high-friction rubber to fit within the rand mold;

inserting the slab of uncured high-friction rubber into the rand mold;

forming a variable-thickness climbing shoe rand by curing the slab with heat and pressure within the rand mold; and bonding the variable-thickness climbing shoe rand to a climbing shoe upper.

* * * * *